Figure 1:
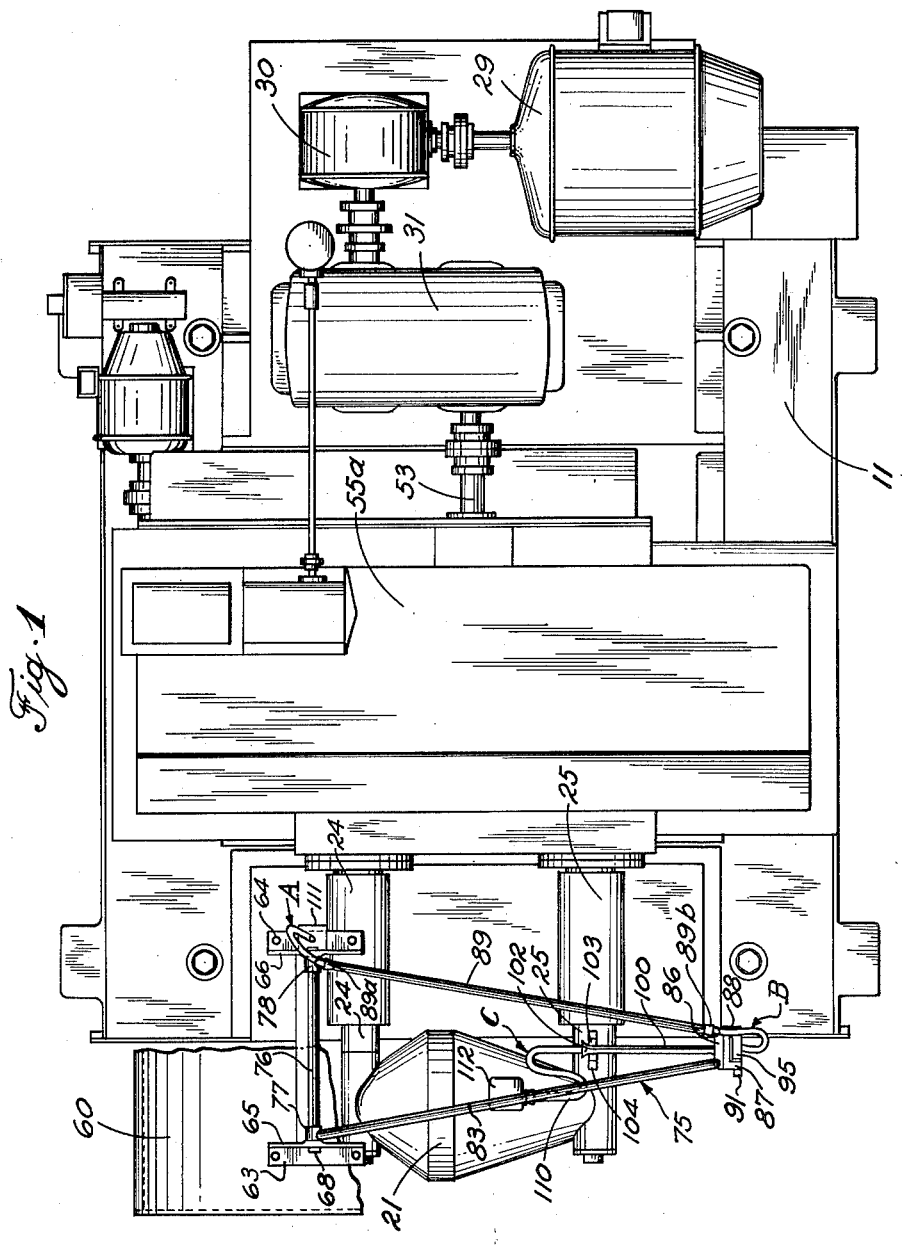
Figure 6:
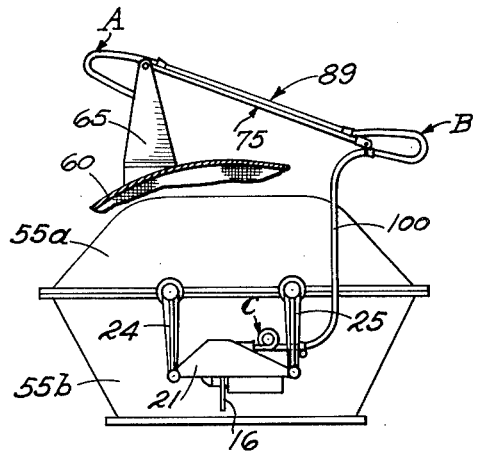
Figure 7:
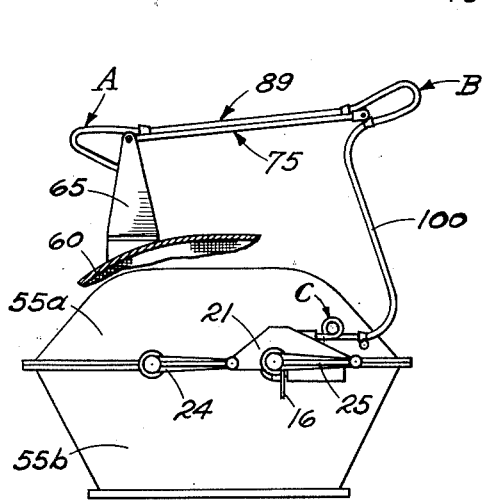
Figure 8:
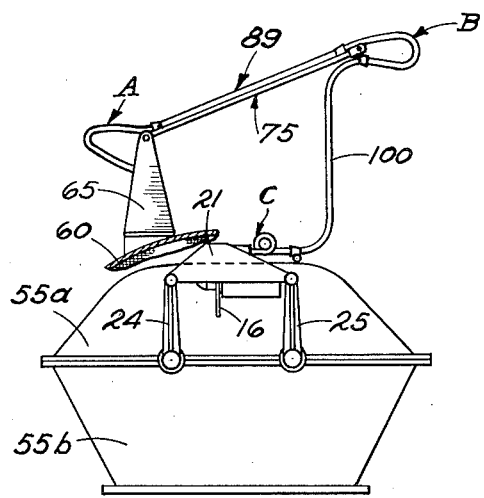
Figure 9:
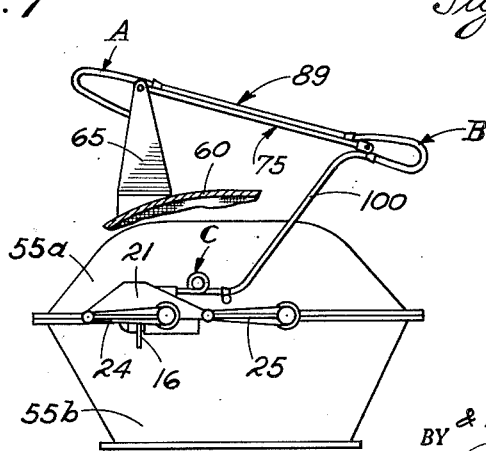

Nov. 30, 1954  W. RODDER ET AL  2,695,931
ELECTRIC CABLE CARRIER FOR FLYING HOT SAWS
Filed Dec. 14, 1949  4 Sheets-Sheet 1

INVENTORS
WILLIAM RODDER
& MICHAEL C. UHRAIN.
BY Bosworth + Sessions
ATTORNEYS

Nov. 30, 1954     W. RODDER ET AL     2,695,931
ELECTRIC CABLE CARRIER FOR FLYING HOT SAWS
Filed Dec. 14, 1949                    4 Sheets-Sheet 2
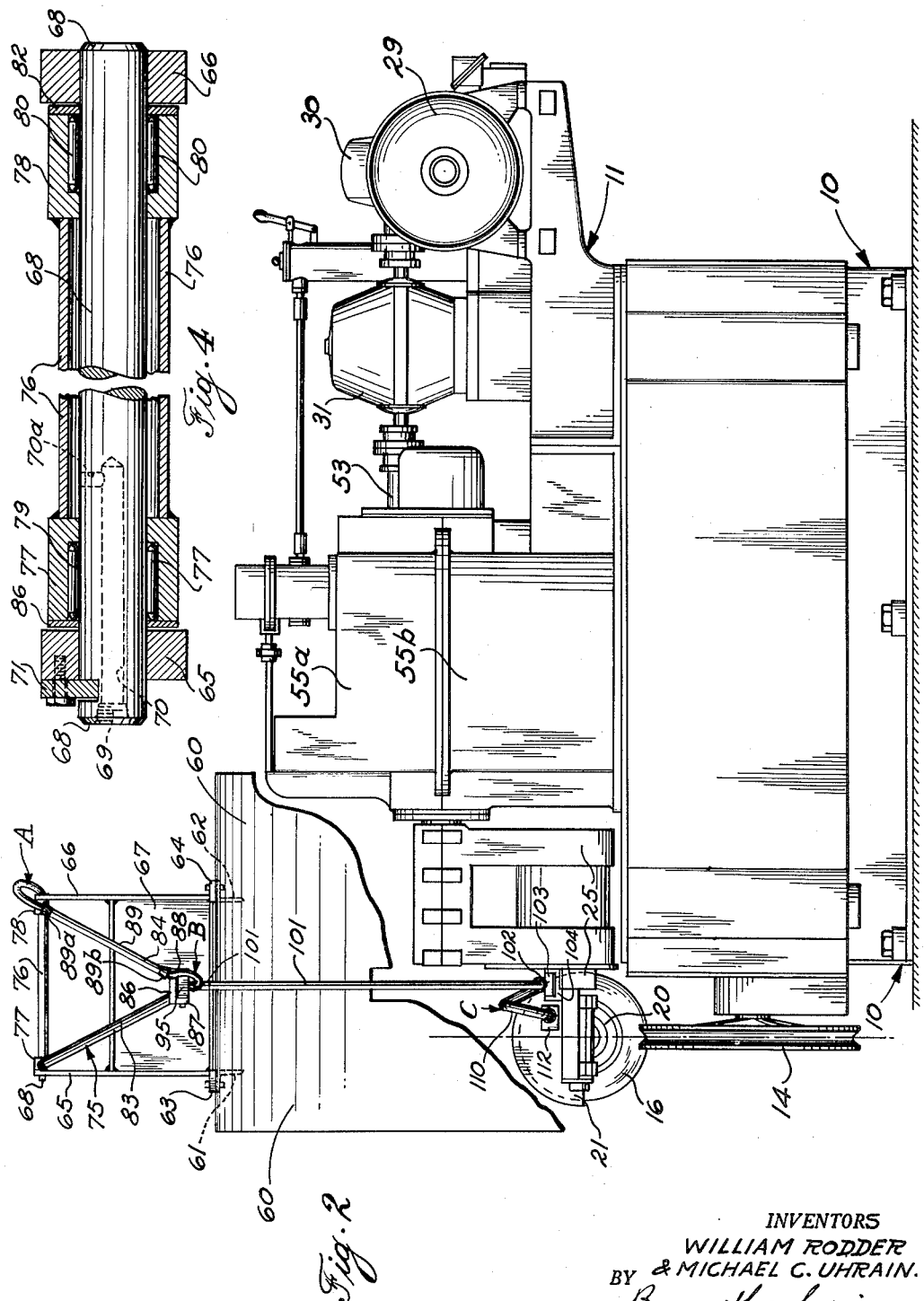
INVENTORS
WILLIAM RODDER
BY & MICHAEL C. UHRAIN.
Bosworth & Sessions
ATTORNEYS

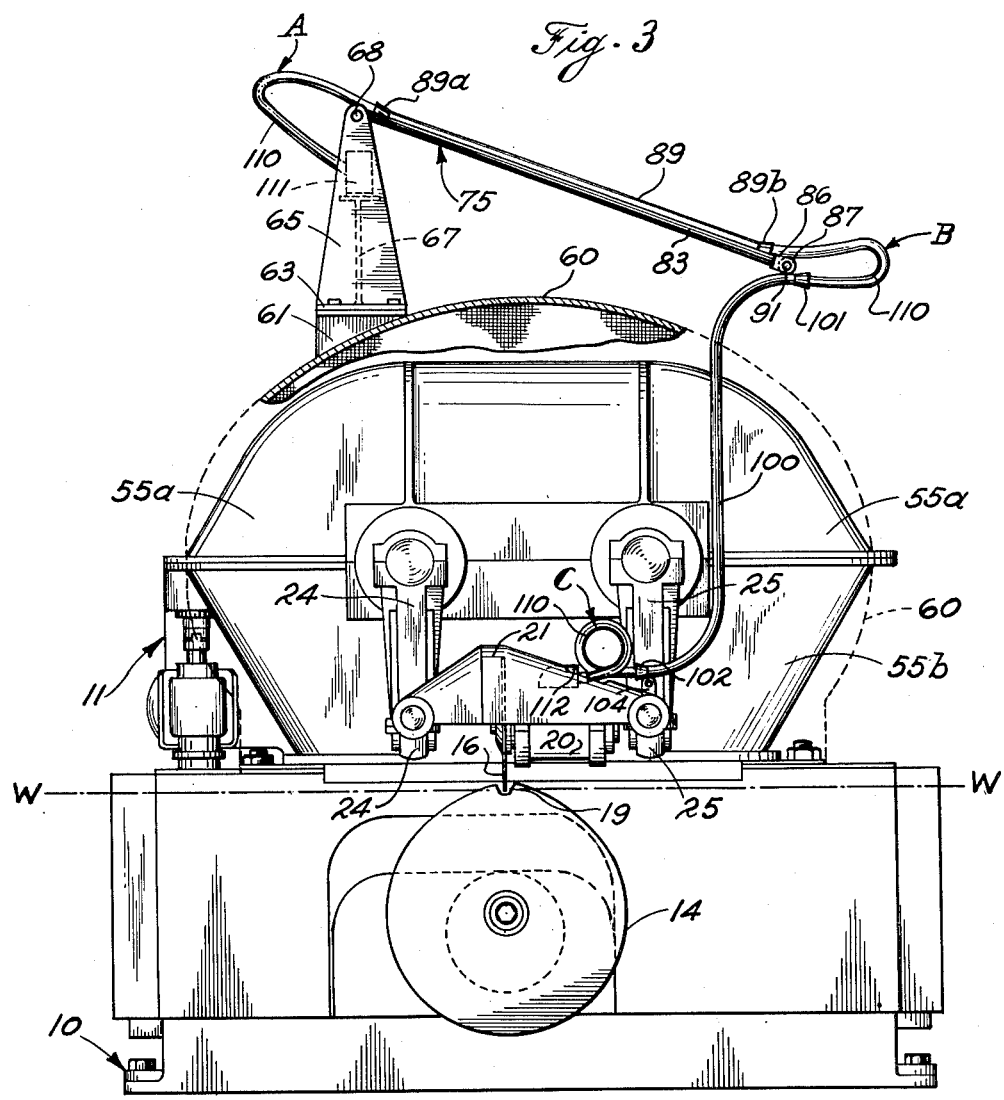
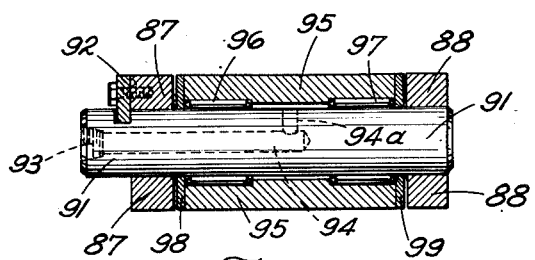

INVENTORS
WILLIAM RODDER
& MICHAEL C. UHRAIN
BY Boswrth + Sessions
ATTORNEYS

United States Patent Office 2,695,931
Patented Nov. 30, 1954

2,695,931

ELECTRIC CABLE CARRIER FOR FLYING HOT SAWS

William Rodder and Michael C. Uhrain, Youngstown, Ohio, assignors to The Aetna-Standard Engineering Company, Youngstown, Ohio, a corporation of Ohio Application December 14, 1949, Serial No. 132,908

2 Claims. (Cl. 191—12)

This invention relates to metal-working apparatus incorporating a dynamo-electric machine, e. g., a motor or the like, traveling in an orbital path, to which machine electric current must be supplied by means of a cable extending from a stationary outlet.

In such apparatus, unless conductor bars or rings and cooperating current collectors can be interposed, one end of the connecting cable must follow the dynamo-electric machine around its orbit. In view of concomitant mechanical difficulties stemming from the necessity of supporting the dynamo-electric machine from the frame of the apparatus as a whole in a manner permitting the machine to move in the desired orbital path, a practicable method of supplying current making use of conductor bars and cooperating current collectors is not easy to work out. On the other hand, the alternative of making the end of the cable movable with the dynamo-electric machine involves the necessity of eliminating or at least minimizing the possible effects of twisting, tangling, whipping and other like aberrations introduced into or induced in the cable as it accompanies the machine around its orbit.

One of the objects of the present invention is to obviate the difficulties due to these and like effects simply, inexpensively and in a manner allowing maximum useful life to be obtained from the cable. Another object is to support, guide and attach the cable with respect to the dynamo-electric machine and the metal working apparatus in such manner as to provide a high degree of control over the movement of the cable. Another object is the provision of a carrier for the cable which is arranged to prevent excessive wear on the cable. Another object is the provision of a carrier whereby twisting and whipping of the cable are eliminated and bending of the cable is kept at a minimum. Another object is to provide a carrier for the cable mounted in such manner that part thereof will remain stationary while another part or parts will be free to move with or in response to movement of the dynamo-electric machine. Other objects and advantages of the invention will be apparent to those skilled in the art to which the invention pertains.

By way of illustration of how the invention may be employed in practice, it is described hereinafter and is illustrated in the accompanying drawings as applied to metal-working apparatus of the kind shown, described and claimed by one of the present applicants in prior application Serial No. 69,521, filed January 6, 1949, for "Flying Hot Saw," Patent No. 2,645,001, to which application reference may be had for a complete understanding of the manner of operation of the apparatus as a whole. To the flying hot saw of the prior application the present invention adds a cable carrier preferably comprising a fixed standard, a movable standard, and an A-shaped connecting member adapted to carry a cable leading from a conduit box or the like to a motor traveling in an orbital path; i. e., the motor driving the saw.

In the accompanying drawings, Figure 1 is a plan of a flying hot saw embodying the cable carrier of the present invention; Figure 2 is a side elevation of the flying hot saw of Figure 1; Figure 3 is a corresponding front elevation; Figure 4 is a cross-section, with parts in elevation, through the pivot shaft assembly; Figure 5 is a similar cross-section through one of the wrist pin assemblies; and Figures 6 to 9 are diagrammatic views illustrating schematically the movement of the cable carrier as it appears in front elevation as in Figure 3.

As brought out in the prior application, the flying hot saw with which the cable carrier of the present invention can be employed as hereinafter explained comprises a base section 10 and a top section 11. Underlying the approximate path W—W of the work (which may take the form of tubing, pipe, rod or the like) is a pear-shaped deflecting cam 14, notched as at 19, which is suitably mounted on base section 10: deflecting cam 14 periodically displaces the work upward into the path of a circular saw 16 driven by a motor 20 that is largely enclosed within a housing 21. The assembly comprising saw 16, motor 20 and housing 21, hereinafter referred to as the saw assembly, is mounted on top section 11 by means of cranks 24 and 25 in such manner that the entire assembly travels counterclockwise as seen in Figure 3. Other elements of the apparatus of the present application that have counterparts in the flying hot saw of the prior application are main drive motor 29, speed reducer 30, P. I. V. drive 31, main drive shaft 53, and a two-part gear housing 55a, 55b in which are contained the gears that serve to transmit power from main drive shaft 53 to cranks 24 and 25.

Not illustrated in the prior application but forming part of the apparatus illustrated in Figures 1, 2 and 3 of the present application is a guard 60 that in general takes the form of an elliptical cylinder. Such guard is characterized by a heavy sheet steel frame curved to give the guard its cylindrical contour, by a closed end made up of heavy metal screening or some other suitable foraminous material, and by an open end disposed immediately adjacent gear housing 55a, 55b. Guard 60 constitutes the base for the cable carrier herein described as constituting or forming part of the preferred embodiment of the invention. The cable carrier is mounted on guard 60 by means of two angle irons 61 and 62, indicated in dotted lines in Fig. 2, which to conform to the curvature of the guard are cut away as indicated in Figure 3. Angle irons 61 and 62 are welded to the guard to provide a solid support for the fixed standard comprising one of the two opposite ends of the cable carrier.

Such fixed standard may conveniently take the form of a broad upright frame mounted on two rectangular bars 63 and 64 which overlie and are bolted to angle irons 61 and 62, respectively. The frame itself consists of two triangular uprights 65 and 66, welded or otherwise affixed to bars 63 and 64, which uprights are themselves connected by an upright H-shaped web 67. Web 67, which is welded to the two uprights 65 and 66, extends from the base of the frame to a point near the middle of the frame, terminating well below the apices of uprights 65 and 66. Thus the upper part of the frame is open as indicated in Figure 2.

Near the apex thereof, each of uprights 65 and 66 has an opening (not shown) for receiving a pivot shaft 68. The latter, shown in detail in Figure 4, has a central end tap 69 for a lubricant fitting, a connecting bore 70 extending inward from the end tap, and a port 70a through which the lubricant is discharged into the space surrounding pivot shaft 68 within the pivot shaft assembly. As indicated in Figure 4, pivot shaft 68 is held against rotation and possible endwise displacement by a key plate 71 which is fixed by cap screws or the like to upright 65.

Surrounding pivot shaft 68 is the base of an A-frame of tubular construction generally designated 75. Such base takes the form of a tubular member 76 welded at opposite ends thereof to two tubular bearing housings machined from bar stock, said bearing housings being designated 77 and 78. Bearing housings 77 and 78, in which are contained needle bearings 79 and 80, respectively, are separated from uprights 65 and 66 by washers 81 and 82. Tubular member 76, together with bearing housings 77 and 78, is so mounted as to be rotatable about the axis of pivot shaft 68 but as a practical matter is restricted, for reasons which will hereinafter appear, to oscillatory angular movement between two extreme positions.

Also forming part of the A-frame 75 are two tubular side members 83 and 84. As illustrated near the upper left-hand corner of Figure 2, the ends of side members 83 and 84 are welded to bearing housings 77 and 78, The two side members converge from the base of A-frame 75 toward a point on the opposite side of the apparatus, where they are welded to a yoke 86 formed with two aligned openings (not shown), one in each of the two arms 87 and 88 thereof. Such arms, which project downward at an angle to the plane of the A-frame, accommodate a wrist pin assembly of the type illustrated in Fig. 5. Welded or otherwise affixed to tubular side member 84 of A-frame 75 are cable guide means taking the form of a tubular member 89 provided with flared ends 89a, 89b: flared end 89a is located adjacent bearing housing 78, while flared end 89b is located adjacent yoke 86. Such guide means may be mounted in any suitable relation to tubular side members 83 and 84 but in the preferred embodiment illustrated in the drawings overlie tubular side member 84.

The wrist pin assembly at the narrow end of A-frame 75 consists, among other things, of a wrist pin 91, a key plate 92 held by cap screws to arm 87 of yoke 86, and a tubular bearing housing machined from bar stock. Wrist pin 91 has therein a central tap 93 for a lubrication fitting, a communicating bore 94 extending axially thereof to a point close to the center of the wrist pin, and a port 94a by which lubricant is discharged into the interior of the wrist pin assembly. The bearing housing, designated 95, contains needle bearings 96 and 97. It is spaced from arms 87 and 88 of yoke 86 by washers 98 and 99. Bearing housing 95 is capable of limited rotary movement about wrist pin 91 analogous to that characterizing the bearing housings surrounding pivot shaft 68; that is to say, oscillatory angular movement between two extreme positions.

Underlying the narrow end of A-frame 75 and connected thereby to the fixed standard on the opposite side of the apparatus is a movable standard taking the form of an S-shaped upright 100 of tubular construction having an upper flared end 101 and a lower flared end 102. The upper or outboard end of upright 100 is welded to bearing housing 95 of the wrist pin assembly illustrated in Figure 5. The lower or inboard end of upright 100 is welded to a similar bearing housing 103 surrounding a wrist pin carried in a yoke 104 (Figure 2). Yoke 104 is mounted for movement with the saw assembly, being located on a fixed sleeve surrounding the crank pin at the lower end of crank 25. Movement of cranks 24 and 25 and of the saw assembly carried thereby thus imposes like movement on the lower or inboard end of S-shaped upright 100.

Cable 110 extends as shown in Figure 3 from a stationary conduit box 111 associated with upright 65 to and along guide means 89 attached to tubular side member 84 of A-frame 75 and thence to and through S-shaped upright 100. In passing from conduit box 111 to flared end 89a of guide means 89, cable 110 forms a loop A allowing a desirable degree of freedom of movement of cable 110 with respect to A-frame 75. In passing out of flared end 89b of guide means 89 and into the upper end 101 of S-shaped upright 100, cable 110 forms a similar loop B. As it leaves lower end 102 at the bottom of S-shaped upright 100, cable 110 is formed into a third loop C. At its near end, it is connected to a conduit box 112 associated with motor 20 in the saw assembly, which, as previously brought out, moves in an orbital path in a counterclockwise direction as seen in Figure 3.

In general, the counterclockwise movement of the saw assembly is indicated diagrammatically in Figures 6, 7, 8 and 9. Respectively, the latter figures show the parts in what may be called the 6, 3, 12 and 9 o'clock positions. By this is meant that in Figure 6 the saw assembly is shown at the bottom of its orbit; in Figure 8 it is shown at the top of its orbit; and in Figures 7 and 9 it is shown in intermediate positions, the former illustrating the assembly in its extreme right-hand position and the latter illustrating the assembly in its extreme left-hand position. As the saw assembly moves to and through these various positions, the lower end of the movable standard comprised of upright 100 moves with it, giving rise to the positions of upright 100 shown in Figures 6 to 9, inclusive. The oscillatory movement of A-frame 75 about the pivot shaft assembly appears in these views. The fixed standard at the opposite end of the cable carrier, including triangular uprights 65 and 66 and the other parts shown in Figures 2 and 3, remains stationary throughout the cycle.

It will be apparent from what has already been said that by means of the cable carrier shown in Figures 1, 2 and 3 a high degree of control is maintained over the cable 110. It is not free to whip or tangle as the saw assembly moves in its orbit to and through the positions indicated in Figures 6 to 9, inclusive; instead, cable 110 is confined to the positions imposed upon it by the cable carrier, any necessary give and take being provided by loops A, B, and C. The cable is not twisted, the bending of the cable in the loops A, B, and C is not abrupt; the cable is not subjected to excessive stresses or abrasion. Thus the operation of the apparatus does not greatly shorten the life of the cable, and the difficulties earlier referred to are avoided by means of the preferred form of cable carrier described in the foregoing specification and illustrated in the accompanying drawings, which preferred form is susceptible of variations in size, proportions, relationship of parts, etc., without departing from the spirit of the invention.

It is intended that the patent shall cover, by summarization in the appended claims, whatever features of patentable novelty reside in the invention.

We claim:
1. In combination with metal-working apparatus including a dynamo-electric machine, a frame, crank members carried by said frame and supporting said dynamo-electric machine at the ends thereof, means for rotating said cranks in an orbital path of 360° to thereby swing said dynamo-electric machine in said orbital path, a cable carrier comprising a fixed standard carried by said apparatus, an orbitally movable standard pivoted to said dynamo-electric machine and spaced from said fixed standard and a rigid member pivotally connecting said fixed and orbitally movable standards, said connecting member and orbitally movable standard including cable guiding means for a cable extending from the fixed standard to said dynamo-electric machine.

2. The combination as claimed in claim 1 in which the orbitally movable standard is in the form of an S-shaped upright with the upper and lower ends extending substantially horizontally, the lower end terminating adjacent the dynamo-electric machine and the upper end terminating adjacent the pivot between the orbitally movable standard and the connecting member.

References Cited in the file of this patent

UNITED STATES PATENTS

| Number | Name | Date |
| --- | --- | --- |
| 1,402,860 | Hoover | Jan. 10, 1922 |
| 1,669,560 | Himes | May 15, 1928 |
| 1,940,178 | Mohr | Dec. 19, 1933 |
| 2,200,518 | Perbal | May 14, 1940 |
| 2,205,665 | Peters | June 25, 1940 |
| 2,242,298 | Halsey | May 20, 1941 |
| 2,332,013 | Rudert et al. | Oct. 19, 1943 |
| 2,517,010 | McGraw | Aug. 1, 1950 |